(12) United States Patent
Ikeda

(10) Patent No.: US 9,883,074 B2
(45) Date of Patent: Jan. 30, 2018

(54) IMAGE FORMING APPARATUS, IMAGE FORMING SYSTEM AND CONTROL METHOD

(71) Applicant: KONICA MINOLTA, INC., Chiyoda-ku (JP)

(72) Inventor: Kazunori Ikeda, Hino (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/449,639

(22) Filed: Aug. 1, 2014

(65) Prior Publication Data

US 2015/0043021 A1 Feb. 12, 2015

(30) Foreign Application Priority Data

Aug. 6, 2013 (JP) .................................. 2013-163090

(51) Int. Cl.
*G06F 3/12* (2006.01)
*H04N 1/32* (2006.01)

(52) U.S. Cl.
CPC ..... *H04N 1/32561* (2013.01); *H04N 1/32117* (2013.01); *H04N 2201/0075* (2013.01); *H04N 2201/3233* (2013.01)

(58) Field of Classification Search
CPC ........... H04N 1/32561; H04N 1/32117; H04N 2201/0075; H04N 2201/3233
USPC ....................................................... 358/1.13
See application file for complete search history.

(56) References Cited

U.S. PATENT DOCUMENTS

| 6,785,727 | B1* | 8/2004 | Yamazaki | ..................... | 709/229 |
| 6,906,813 | B1* | 6/2005 | Tuchitoi et al. | ............. | 358/1.14 |
| 8,072,623 | B2* | 12/2011 | Ooshio | ........................ | 358/1.13 |
| 2002/0135792 | A1* | 9/2002 | Sommer et al. | ............. | 358/1.13 |
| 2006/0017952 | A1* | 1/2006 | Ataka | .......................... | 358/1.13 |

(Continued)

FOREIGN PATENT DOCUMENTS

| JP | 2000-103142 | A | | 4/2000 | | |
| JP | 2000103142 | A | * | 4/2000 | ............. | B41J 29/38 |

(Continued)

OTHER PUBLICATIONS

Kano et al., JP 2000-103142, Apr. 11, 2000; Fuji Xerox.*

(Continued)

*Primary Examiner* — Neil R McLean
(74) *Attorney, Agent, or Firm* — Buchanan Ingersoll & Rooney PC

(57) ABSTRACT

Provided are an image forming apparatus, an image forming system and a method of controlling the image forming apparatus. The image forming apparatus for conducting processing according to established settings thereon, includes: an output section for outputting a notification; and a control section. The control section is configured to monitor a change in at least one of states and settings of the image forming apparatus, where the change is to be made during a time period from a time when receiving a setting operation about a certain processing conducted by a user to a time when receiving an instruction to start the certain processing from the user, and the change comes from an action of another user. The control section is further configured to, in response to the change, output through the output section a notification that the change has been made.

21 Claims, 6 Drawing Sheets

(56) References Cited

U.S. PATENT DOCUMENTS

| | | | | |
|---|---|---|---|---|
| 2007/0275709 A1* | 11/2007 | Lei | .................. | H04L 63/0861 |
| | | | | 455/421 |
| 2009/0190163 A1* | 7/2009 | Sato | .......................... | 358/1.15 |
| 2013/0063759 A1* | 3/2013 | Kutoh et al. | ................ | 358/1.14 |

FOREIGN PATENT DOCUMENTS

| | | | | |
|---|---|---|---|---|
| JP | 2009-177547 A | | 8/2009 |
| JP | 2011-055348 A | | 3/2011 |
| JP | 2011055348 A | * | 3/2011 |
| JP | 2012-086448 A | | 5/2012 |
| JP | 2013-054624 A | | 3/2013 |
| JP | 2013-080387 A | | 5/2013 |
| JP | 2013080387 A | * | 5/2013 |

OTHER PUBLICATIONS

Office Action (Notification of Reasons for Refusal) dated Apr. 21, 2015, by the Japanese Patent Office in corresponding Japanese Patent Application No. 2013-163090, and an English Translation of the Office Action. (8 pages).

* cited by examiner

IMAGE FORMING APPARATUS, IMAGE FORMING SYSTEM AND CONTROL METHOD

This application is based on Japanese Patent Application No. 2013-163090 filed on Aug. 6, 2013, in the Japan Patent Office, the entire content of which is hereby incorporated by reference.

TECHNICAL FIELD

The present invention relates to an image forming apparatus, an image forming system that includes the image forming apparatus concerned and a method of controlling operations to be conducted in the image forming apparatus concerned.

BACKGROUND

On an occasion when an image forming apparatus, such as an MFP (Multi-Function Peripheral), is employed for performing a kind of processing, various kinds of controlling operations are conducted so as to acquire a desired result.

For instance, Japanese Patent Application Laid-Open Publication (JP-A) No. 2000-103142 sets forth a print processing apparatus that receives a tray-designated print job in which a paper sheet tray to be employed is designated, and then, implements print processing for the job above-received. The print processing apparatus concerned includes a paper-tray change history information table in which paper-sheet change times in regard to paper sheets to be accommodated into a paper sheet tray are respectively correlated to paper sheet kinds. The print processing apparatus further includes a control section that compares the first kind of paper sheets, which were accommodated into the designated paper sheet tray at the time when the tray-designated print job was accepted, and the second kind of paper sheets, which are accommodated into the designated paper sheet tray concerned at the time when the tray-designated print job is commenced, with each other, based on the paper-tray change history information table above-mentioned, so as to implement the print processing concerned in a case that the first and the second kinds of paper sheets coincide with each other. Accordingly, by determining whether or not the kind of paper sheet has changed, based on the paper-tray change history information table, it is possible to prevent the print processing apparatus concerned from applying the print processing to the unintended paper sheets.

Further, JP-A No. 2011-055348 sets forth an image forming apparatus that reads a document to create image data. The image forming apparatus includes: a detecting section that detects a presence or absence of a document; a plurality of operating sections that accept user's operations; and a control section. The control section accepts input information representing a relationship between the user and the document detected by the detecting section from one or more of the operating sections, at the time when the detecting section detects the document concerned, and then, by parsing the contents of the input information above-accepted, specifies a specific operating section, currently operated by the owner of the document concerned, from the plurality of operating sections concerned. Accordingly, by accepting the user's operation inputted only from the specific operating section, it is possible to prevent the image forming apparatus concerned from accepting unintended operations.

Still further, JP-A No. 2009-177547 sets forth a system configuration that includes: a document reading section that reads a document; a scan data creating section that creates scan data from the document read by the document reading section; and a communication section that receives a scan implementation command, including first specific information, from an upper level apparatus, and transmits the scan data created by the scan data creating section; an inputting section to input second specific information from an operating section; a control section that controls the operation for implementing the scanning based on the scan implementation command. When determining that the first specific information is equivalent to the second specific, the control section implements the scanning operation. Accordingly, by implementing the processing only in a case that the first and the second specific information coincide with each other, it is possible to prevent the concerned system from accepting unintended operations.

In this connection, for instance, in a case where the image forming apparatus is employed for implementing a copy processing, sometimes, an instruction to start the copy processing may be issued after some time have elapsed since the document was placed onto a platen, desired paper sheets were set into a paper sheet tray, and processing conditions were established by operating an operating panel thereof. Further, in such a case where a plurality of image forming apparatuses are employed together for implementing processing, sometimes, an instruction to start the processing may be issued to all the plurality of image forming apparatuses at once, after documents were placed onto the plurality of image forming apparatuses, respectively, desired paper sheets were set into each of the plurality of image forming apparatuses, and processing conditions were established by operating an operating; panel provided in each of the plurality of image forming apparatuses.

Still further, in a case of such an image forming; apparatus that can be remotely operated by employing a communication terminal device, such as an exclusive operating terminal device, a smartphone, a tablet terminal device, etc., (hereinafter, referred to as a remote terminal device as a general term of them), sometimes, an instruction to start the copy processing may be issued by using a remote terminal device, after the document was placed onto a platen, desired paper sheets were set into a paper sheet tray, and processing conditions were established by operating an operating panel thereof.

As above-mentioned, in a case where an instruction to start the copy processing is issued after some time have elapsed since the various kinds of settings, including the document setting, the paper sheet setting, the establishment of the processing conditions, etc., have been completed without registering the settings as the reserved job, and have been left as it is, sometimes, the states of the document, the paper sheets, the establishment of the processing conditions, etc. may be changed by a certain factor caused by an action conducted by a third person during the time that the apparatus is waiting the instruction. In such the case as above-mentioned, unless the original user can recognize the fact that the states of the document, the paper sheets, the setting of the processing conditions, etc. have been changed from the original states, the processing would be commenced under the changed states and settings. As a result, there has arisen such a problem that the original user cannot implement the intended processing. The above-mentioned problem has arisen not only in the case that the image forming apparatus is employed for implementing a copy operation, but also possibly arisen in such a case that a scan transmission processing or a facsimile transmission processing is to be implemented. The present invention seeks to solve the problem.

SUMMARY

There are disclosed illustrative image forming apparatuses, illustrative image forming systems and illustrative control methods.

An illustrative image forming apparatus reflecting one aspect of the present invention is an image forming apparatus for conducting processing according to established settings. The image forming apparatus comprises: an output section for outputting a notification; and a control section. The control section is configured to monitor a change in at least one of states and settings of the image forming apparatus to be made during a time period from a time when receiving a setting operation about a certain processing conducted by a user to a time when receiving an instruction to start the certain processing from the user, where the change comes from an action of another user. The control section is further configured to, in response to the change, output through the output section a notification that the change has been made.

An illustrative image forming system reflecting one aspect of the present invention is an image forming system comprising: the above image forming apparatus; and another image forming apparatus connected to the image forming apparatus with a communication network. The another image forming apparatus includes an output section for outputting a notification and a control section. The control section of the image forming apparatus is configured to, in response to the change, send authentication information of the user and information that the change has been made, to the another image forming apparatus through the output section of the image forming apparatus. The control section of the another image forming apparatus is configured to output the notification through the output section of the another image forming apparatus, on the another image forming apparatus being operated by a user identified by the authentication information.

An illustrative image forming system reflecting one aspect of the present invention is an image forming system comprising: the above image forming apparatus; and a remote control terminal for operating the image forming apparatus by remote control. The remote control terminal is connected to the image forming apparatus with a communication network and includes an output section for outputting a notification and a control section. The control section of the image forming apparatus is configured to, in response to the change, send authentication information of the user and information that the change has been made, to the remote control terminal through the output section of the image forming apparatus. The control section of the remote control terminal is configured to output the notification through the output section of the remote control terminal, on the remote control terminal being operated by a user identified by the authentication information.

An illustrative control method reflecting one aspect of the present invention is a control method of an image forming apparatus for conducting processing according to established settings. The method comprises: monitoring a change in at least one of states and settings of the image forming apparatus to be made during a time period from a time when receiving a setting operation about a certain processing conducted by a user to a time when receiving an instruction to start the certain processing from the user, where the change comes from an action of another user. The method further includes, in response to the change, outputting a notification that the change has been made through an output section of the image forming apparatus.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Figure 1:
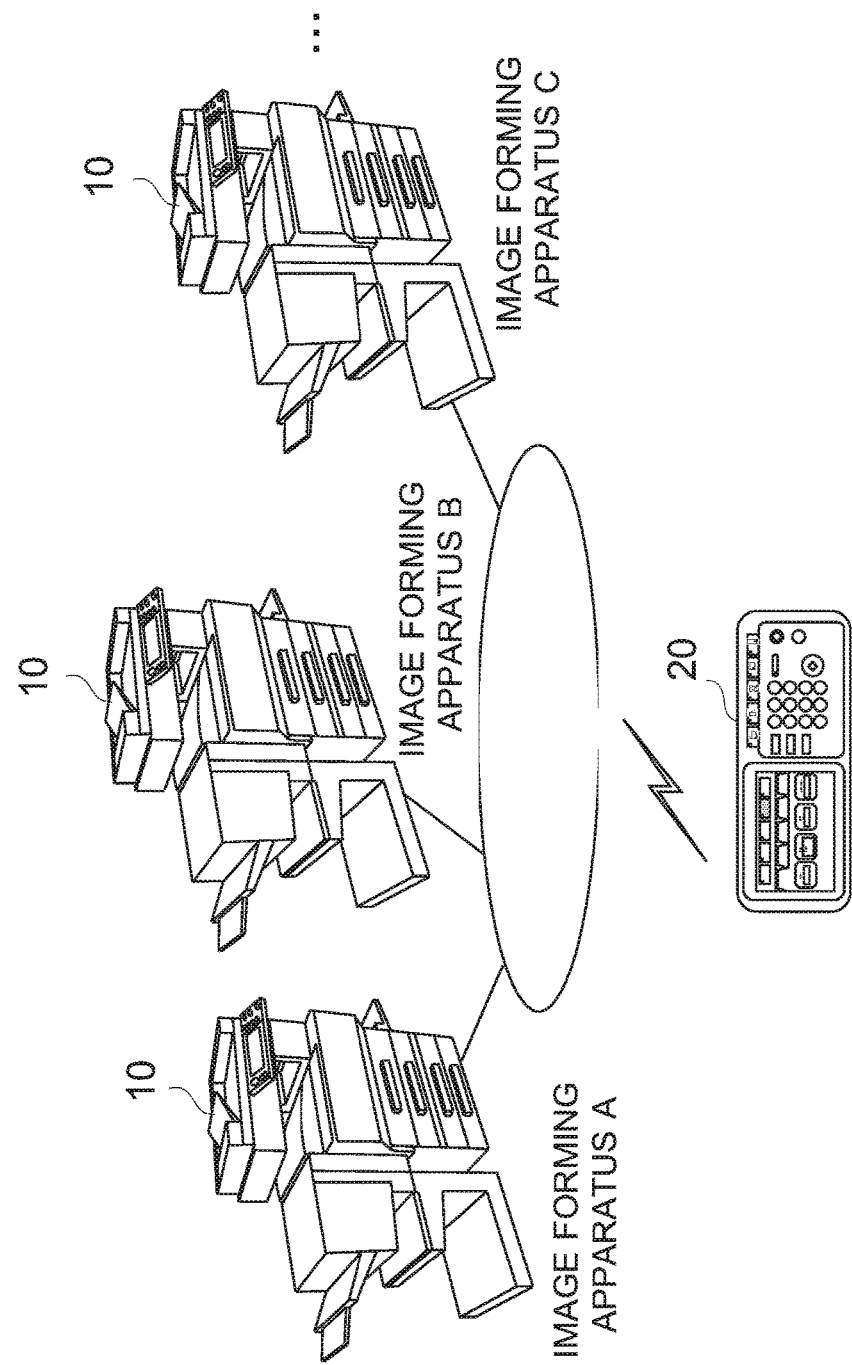
FIG. 1 is a schematic diagram illustrating an arrangement of an image forming system in accordance with an embodiment of the present invention.

Illustrative embodiments of image forming apparatuses, image forming systems and control methods will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the illustrative image forming apparatuses, illustrative image forming systems and illustrative control methods as embodiment of the present invention, it becomes possible to prevent in advance such the trouble that a certain processing starts while a state and/or setting thereof has changed from the original state, due to an action performed by a third person during the time period from the time when a user has completed the setting operation for the certain processing, to the later time when the user actually issues an instruction to start the certain processing.

This is because, the image forming apparatus monitors various kinds of changes, such as a change in state of a document, a change in state of paper sheets, a change in settings of processing conditions, which come from actions performed by a third person, to be made during a time period from a time when receiving any of operations conducted by a certain user including setting a document onto a platen, setting paper sheets into the paper feed tray, and setting a processing condition, to the later time when actually receiving an instruction to start the processing from the certain user. Further, when detecting any of the changes as a result of the monitoring operation above-mentioned, the image forming apparatus notifies a user the fact that a change in at least one of the states and settings has been made, so as to urge the user to confirm the states and the settings.

As described in the descriptions about the background, in a case where, on an image forming apparatus, a certain user has completed operations for setting a document and paper sheets, and then, conducts operations for establishing processing conditions of processing to be implemented as a normal job instead of the reserved job, and after a while, issues an instruction to start the processing, any of a change in state of a document, a change in state of paper sheets and a change in settings of processing conditions can be made due to a certain factor coming from an action conducted by a third person during the time span the image forming apparatus is waiting the start instruction. It makes the user difficult to implement the processing on the image forming apparatus as originally intended by the user.

For instance, the following situation can be considered in such a case that plural image forming apparatuses are employed for making a massive amount of copies of a document. After a user has set the document onto a scanner of each image forming apparatus, has set desired paper sheets into a paper feed tray of each image forming apparatus, and has established processing conditions about certain processing by operating an operation panel of each image forming apparatus, the user has move to a place being apart from the positions of the image forming apparatuses, with bring a remote terminal with the user. Under the situation, the user may send an instruction to start the certain processing from the remote terminal to all the plural image forming apparatus after a while. However, in the meantime of the user's leaving, a third person may perform any of the following actions on any of the image forming apparatuses: removing the document from any of the image forming apparatuses, replacing the document with another document, removing paper sheets currently set in the paper feed tray, replacing the paper sheets with other paper sheets, and changing a processing condition by using the operation panel. When the user issues an instruction to start the processing from the remote terminal without recognizing the above actions performed by the third person, it may be impossible for the user to implement the processing originally intended by the user.

Further, even in a case where a single unit of image forming apparatus is employed for copying a document, after setting a document onto a scanner of the image forming apparatus and establishing the processing conditions by operating an operating panel, the user may temporarily leave the image forming apparatus to replenish a desired kind of paper sheets into the paper feed tray. In this case, sometimes, a third person may remove the document, may replace the document with another document and/or may change the processing conditions from the operating panel in the meantime of the user's absence. Then, if the concerned user returns to the image forming apparatus after the replenishment of paper sheets has been completed and issues the instruction to start the processing without recognizing the above-mentioned actions performed by the third person, it is impossible for the concerned user to implement the processing intended by the user, as well.

To overcome the above-mentioned inconvenience, according to an embodiment of the present invention, an image forming apparatus includes a structure to conduct the following control. The image forming apparatus monitors various kinds of changes, such as a change in state of a document, a change in state of paper sheets, and a change in settings of processing conditions (based on output changes of sensors disposed at a scanner and a paper feed tray thereof, and an output change of a touch sensor mounted over the operating panel thereof). The changes come from actions performed by another user (for instance, actions of removing the document, replacing the document, removing the paper sheets currently accommodated in the paper feed tray, replacing the paper sheets with other paper sheets and changing the processing conditions from the operating panel, which may be performed by a third person), and are to be made during the period from the time when receiving a setting operation about a certain processing conducted by a user (that is, when a certain user has completed any of actions for setting a document onto a platen, setting paper sheets into the paper feed tray, establishing processing conditions by operating the operating panel, etc.), to the time when receiving an instruction to start the certain processing from the user (that is, when the concerned user issues an instruction to start the certain processing). When detecting any of the change as a result of the monitoring operation above-mentioned, the image forming apparatus notifies a user through an output section about the fact a change in at least one of state of the document, state of the paper sheets, settings of the processing conditions, etc., has been made, so as to give a warning to the user concerned.

According to the above descriptions, since the processing is not implemented under the states and the settings unintended by the user, it becomes possible to prevent the image forming apparatus from implementing an inappropriate processing.

EXAMPLES

Figure 2:
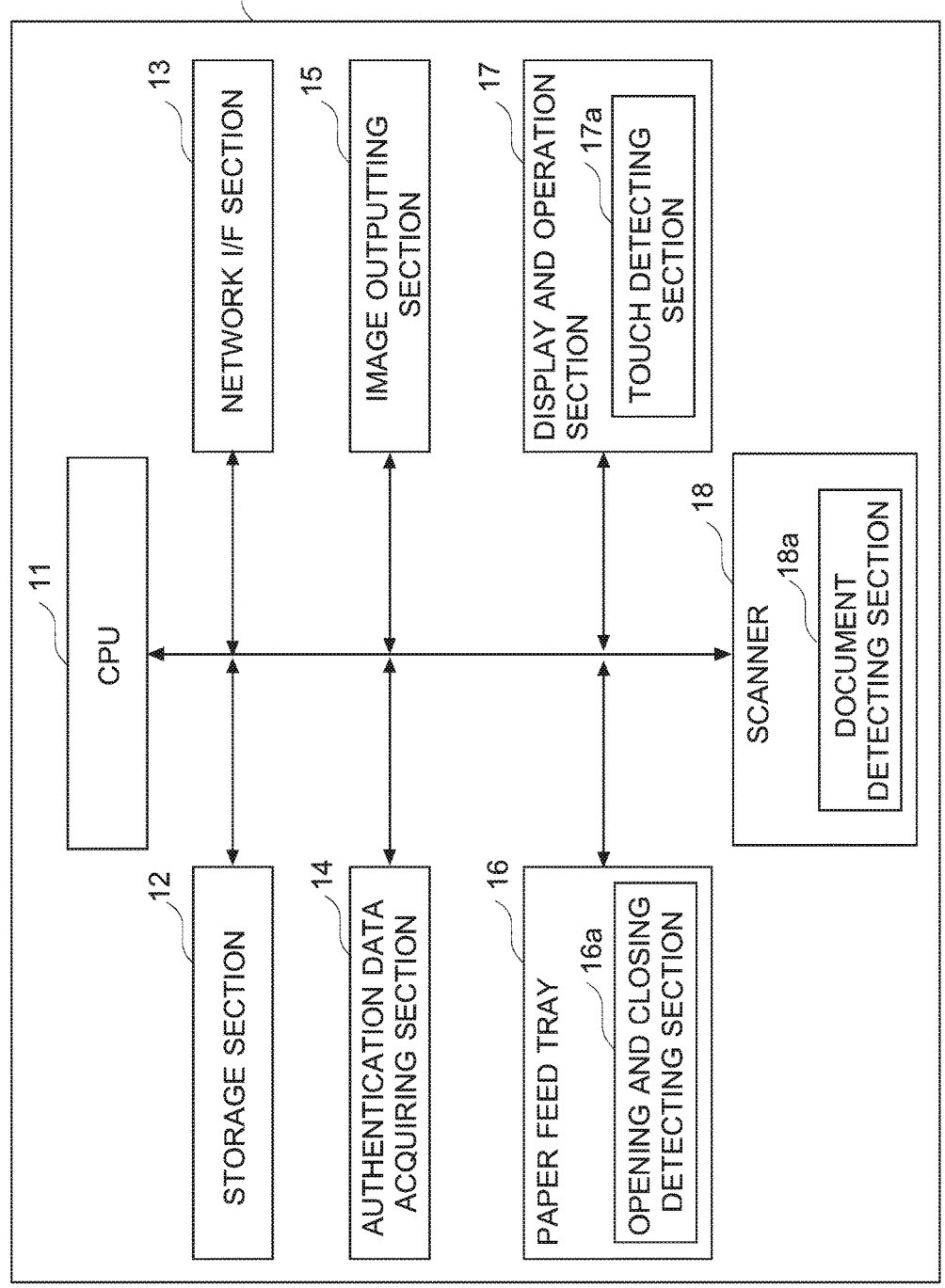
FIG. 2 is a block diagram illustrating a configuration of an image forming apparatus in accordance with an embodiment of the present invention.
Figure 3:
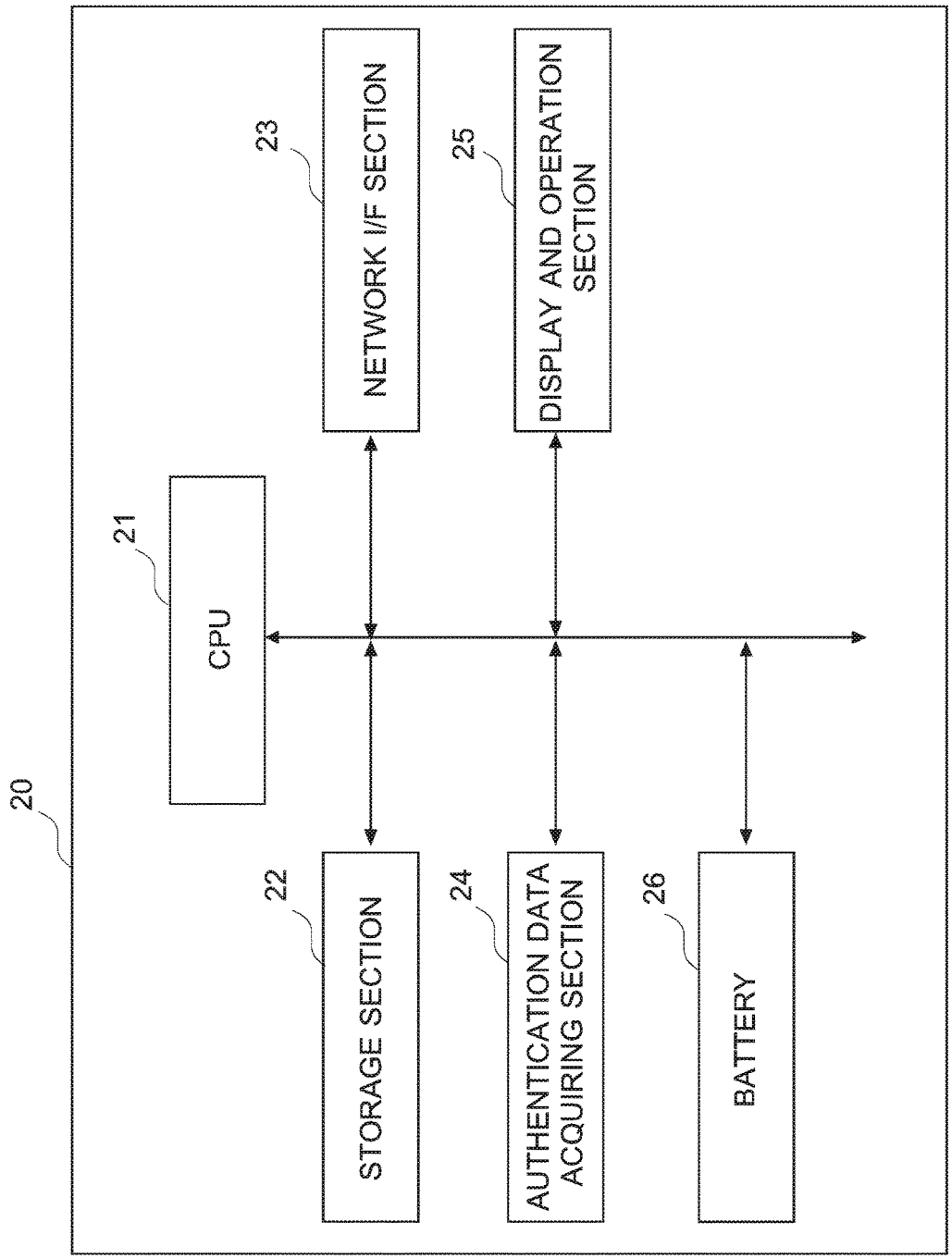
FIG. 3 is a block diagram illustrating a configuration of a remote terminal in accordance with an embodiment of the present invention.
Figure 4:
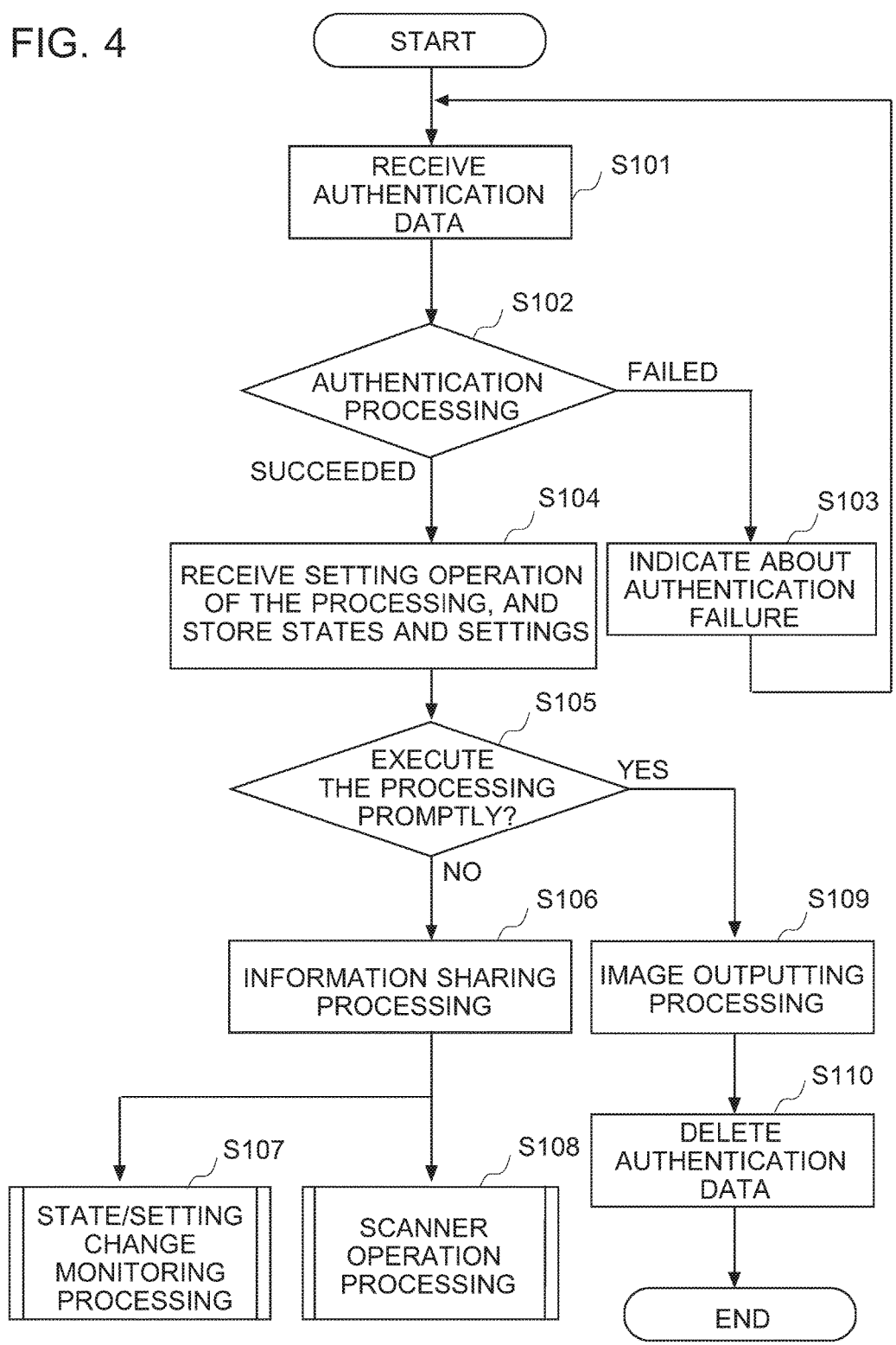
FIG. 4 is a flowchart illustrating a flow of processing (overall processing) to be performed in an image forming system in accordance with an embodiment of the present invention.
Figure 5:
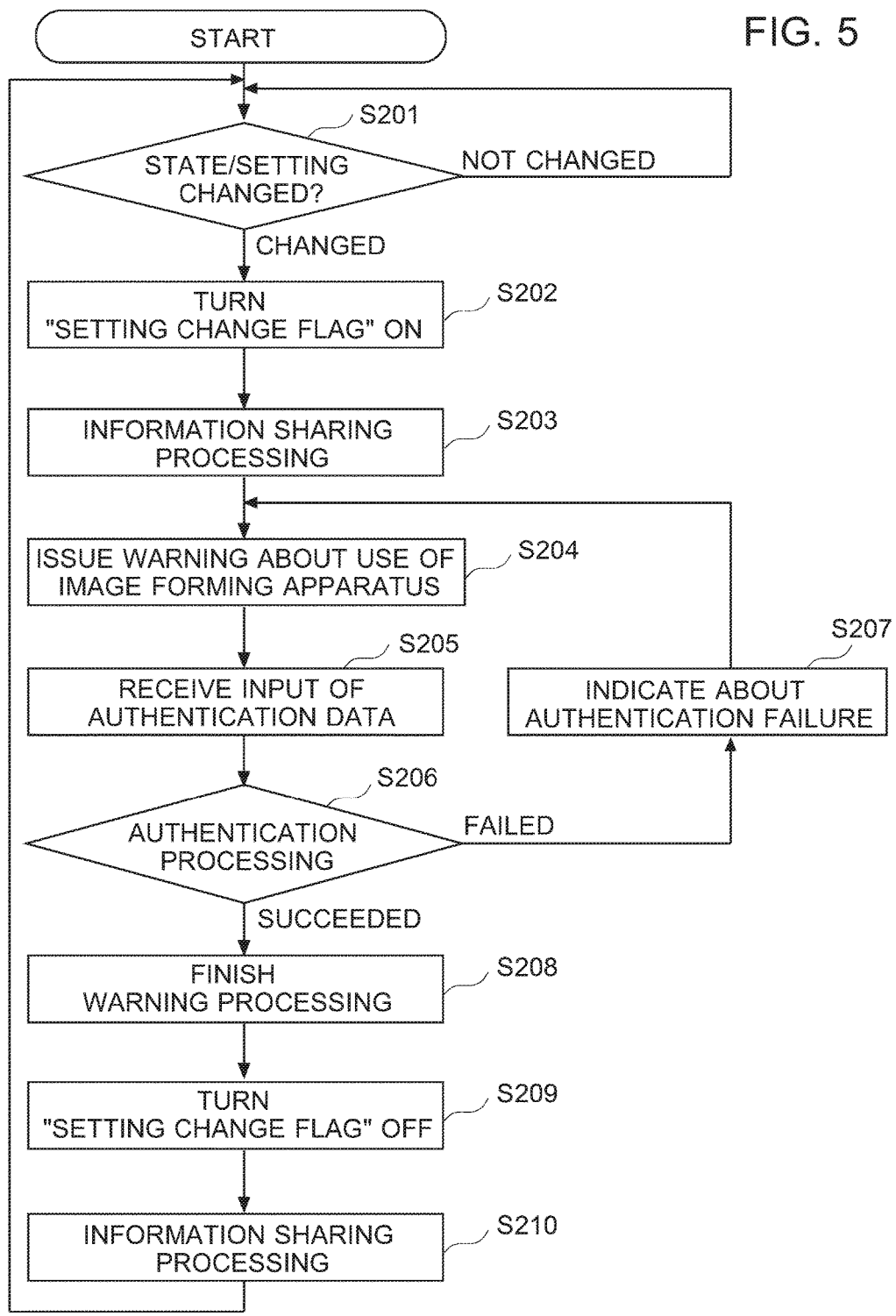
FIG. 5 is a flowchart illustrating a flow of processing (state and setting change monitoring processing) to be performed in an image forming system in accordance with an embodiment of the present invention.
Figure 6:
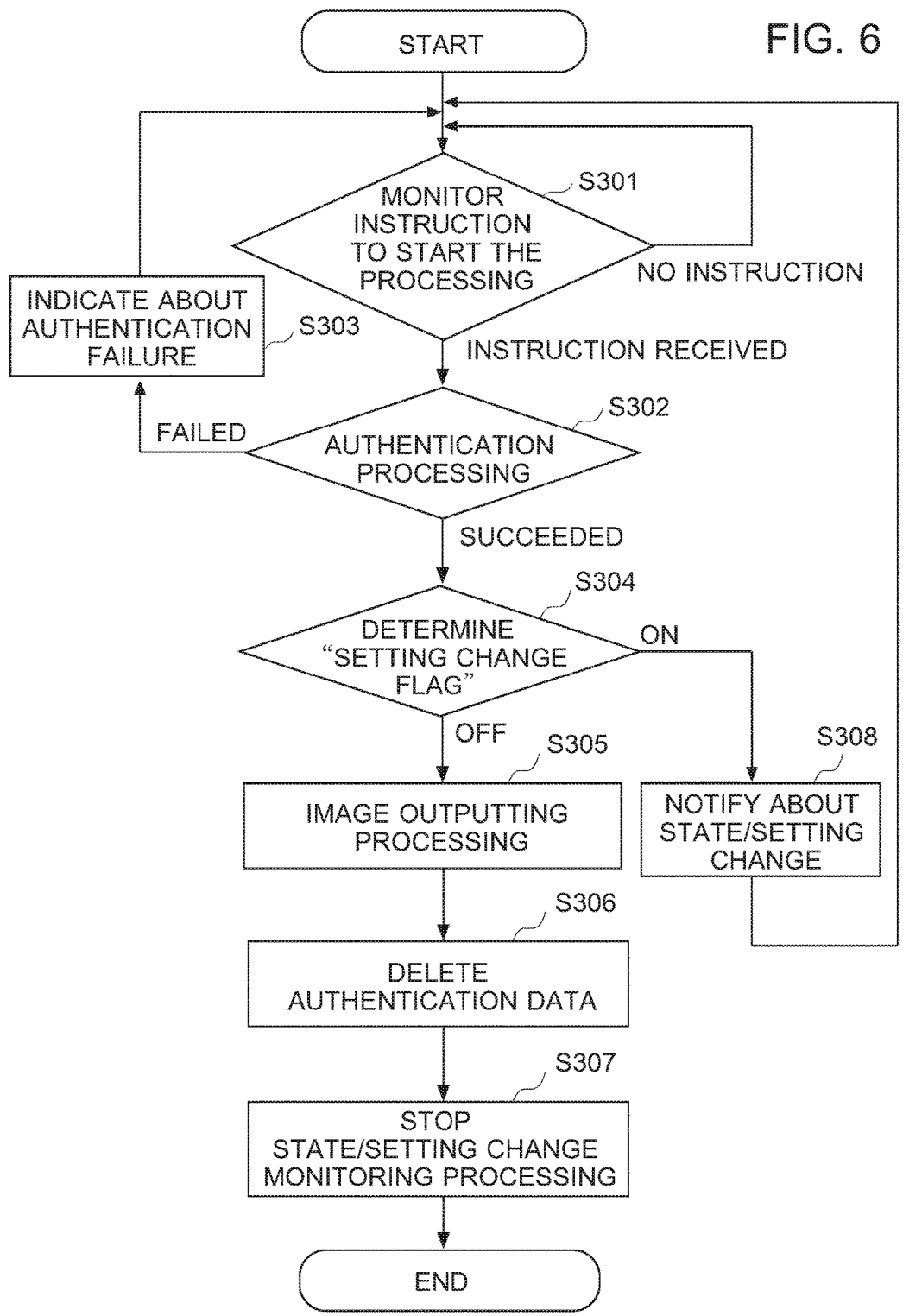
FIG. 6 is a flowchart illustrating a flow of processing (scanner operation processing) to be performed in an image forming system in accordance with an embodiment of the present invention.

In order to further describe the preferred embodiment of the present invention in detail, referring to FIG. 1 through FIG. 6, examples of an image forming apparatus, an image forming system and a control method, in accordance with an embodiment of the present invention, will be detailed in the following. FIG. 1 is a schematic diagram illustrating a configuration of the image forming system of the present example. FIG. 2 is a block diagram illustrating a configuration of the image forming apparatus of the present example, and FIG. 3 is a block diagram illustrating a configuration of a remote terminal of the present example. FIGS. 4 through 6 are flowcharts illustrating flows of processing to be conducted in the image forming system of the present example.

Incidentally, hereinafter, each of actions to be performed by a user for setting a document onto a scanner, setting paper sheets into a paper feed tray and setting processing conditions by operating an operation panel, is defined as a setting action or a setting operation, serving as a general term for them. Further, various kinds of states and settings, such as a state of a document set onto a scanner, a state of paper sheets set into the paper feed tray, settings of processing conditions established by using the operation panel, etc., are defined as states and settings, serving as a general term for them.

As indicated in the schematic diagram illustrating in FIG. 1, the image forming system of the present example includes: a single or a plurality of image forming apparatuses 10 (three of an image forming apparatus A, an image forming apparatus B and an image forming apparatus C are indicated in the schematic diagram illustrating in FIG. 1); and a remote terminal 20 for operating the image forming apparatus(es) 10 from a distance (remote operation). The plurality of image forming apparatuses 10 and the remote terminal 20 are connected to each other with wired and/or wireless networks. Each of the image forming apparatuses 10 and the remote terminal 20 will be detailed in the following.

Image Forming Apparatus:

As indicated in the block diagram illustrated in FIG. 2, the image forming apparatus of the present example can be an MFP (Multi-Function Peripheral) or the like, and is constituted by components including a CPU (Central Processing Unit) 11, a storage section 12, such as a ROM (Read Only Memory), a RAM (Random Access Memory), etc., a network interface (I/F) section 13, an authentication data acquiring section 14, an image outputting section 15, a paper feed tray 16, a display and operation section 17, and a scanner 18.

The CPU 11 executes controlling programs stored in the ROM in order to conduct arithmetic calculation processing for controlling overall operations to be performed in the image forming apparatus 10. The ROM stores various kinds of programs including the controlling programs to be executed by the CPU 11 and other data, therein. The RAM stores arithmetic calculation results, setting change flags detailed later, authentication data, etc., therein. Then, the CPU 11, the storage section 12, and, as needed, a storage device, such as an HDD (Hard Disc Drive), constitute a control section.

The control section, above-mentioned, applies various kinds of age processing, such as an edge enhancement processing, a smooth processing, a color conversion processing, etc., to image data read by the scanner 18, in addition to conducting other processing. Further, the control section receives signals outputted from various kinds of sections, such as a document detecting section 18a equipped in the scanner 18, an opening and closing detecting section 16a equipped in the paper feed tray 16, a touch detecting section 17a equipped in the display and operation section 17, and checks a change in the states and settings based on the signals. The change in states and settings to be checked is made during a time period from the time when a certain user performs an setting operation about a certain processing and leave the image forming apparatus without registering the established settings as a reserved job or the like for a while, to the time when the user issues an instruction to start the certain processing. Further, the change to be checked comes from an action performed by another user (a third person). When detecting the change in the states and settings, the control section outputs a notification that a change in the states and the settings has been made, through an output section, by operating the display and operation section 17 to display a message indicating the notification or operating a speaker to output an audible message indicating the notification, so as to notify the change to a user. Further, when detecting the change in the states and settings, the control section sends (outputs) information about the change in the states and settings and user information, through a network interface section I/F 13 which will be described below, to the other devices including image forming apparatuses 10 and the remote terminal 20. Still further, when detecting the change in the states and settings, the control section set a specific flag so as to make the concerned apparatus ignore an instruction to start the processing, which is to be sent from the display and operation section 17 or the remote terminal 20, until the specific flag is cleared. In this connection, either hardware or software (control programs) may be employable for actually implementing the control processing above-mentioned. Further, each of the display and operation section 17, the speaker and the network interface section I/F 13 works as an output section which outputs a notification or information of a change in states and settings.

In this connection, hereinafter, the term of "an action performed by another user" is defined as any one of various kinds of actions, for instance, including: removing a document from the scanner 18; replacing a document with another document; changing an orientation of a document; removing paper sheets from the paper feed tray 16; replacing paper sheets with other paper sheets; changing an orientation of paper sheets; and operating the display and operation section 17 to change any one of various kinds of processing conditions, including, a size of paper sheet, a number of copies, an option of color or monochrome, an option of enlargement or reduction, a page allotment, a punching mode, stapling mode, etc., and represents a general sense of action that affects an output result of a certain processing.

Further, hereinafter, the term of "a change in states and settings" represents any one of such facts that: a document has removed from the scanner 18; another document is set; an orientation of the document has changed; the paper feed tray 16 has become empty; another kind of paper sheets have been set into the paper feed tray 16; an orientation of paper sheets has changed; a processing condition established by a certain user through the display and operation section 17 has changed; and so on. However, the above-mentioned term of "a change in states and settings" does not represent such a fact that is caused by an action of another user performed before a certain user implements a setting operation. For instance, under the situation that a certain user performs a setting operation in midcourse of implementing another user's job or after the reservation of the other user's job has been completed, and then, the implementation of the processing requested by the certain user is commenced, such a case that no paper sheet remains or an amount of toner becomes short because of the job which has been implemented or reserved before the setting operation of the certain user is not regarded as "a change in states and settings".

The network interface section 13 is constituted by a NIC (Network Interface Card), etc., so as to implement an operation for connecting with another one of image forming apparatuses 10 through a communication network, such as a wireless LAN (Local Area Network), a wired LAN (Local Area Network), etc., which is in conformity with any one of the communication standards including the Ethernet (Registered Trade Mark), the Token Ring, the FDDI (Fiber Distributed Data interface), etc. In addition, the network interface section 13 also establishes a connection for communicating with the remote terminal 20, by employing any one of near field wireless communication method, such as a wireless LAN, the Bluetooth (Registered Trade Mark), an NFC (Near Field Communication), the TransferJet (Registered Trade Mark), etc., an infrared data communication, a visible light communication, etc.

The authentication data acquiring section 14 operates the display and operation section 17 to display an input screen which allows a user to input authentication data thereon, and then, compares the inputted authentication data (for instance, a user's ID and/or password, user's identification information such as biometric authentication information or the like, identification information of the remote terminal 20 such as an ID of remote terminal 20 and/or an IP address, etc.), which has been inputted from the input screen by the user, with authentication data stored in advance into the storage section 12. Successively, when determining that the inputted authentication data coincides with the stored authentication data, the authentication data acquiring section 14 determines that the concerned user has an operating right in regard to a certain operation of the image forming apparatus 10.

The image outputting section 15 performs a printing operation for printing an image onto a paper sheet, based on the processed image data acquired by applying various kinds of image processing, conducted by the control section, to original image data. Concretely speaking, the image outputting section 15 performs consecutive processing that include: forming an electrostatic latent image by irradiating a light beam, intensity of which is modulated in accordance with the processed image data and which is emitted from an exposing device, onto a photoreceptor drum uniformly charged by a charging device; developing the electrostatic latent image by adhering electrically-charged toner thereon in a developing device; primarily transferring the toner image above-developed onto a transfer belt; secondarily transferring the toner image, residing on the transfer belt, onto the paper sheet; and further, fixing the toner image, residing on the paper sheet, thereon, by employing a fixing device.

The paper feed tray 16 serves as a container to contain paper sheets on which the image outputting section 15 forms images, therein, and is provided with the opening and closing detecting section 16a that is constituted by a photosensor, an electric contact, etc. Further, the opening and closing detecting section 16a detects opening and closing of the door equipped in the paper feed tray 16 and a presence or absence of a paper sheet currently contained in the paper feed tray 16, and then, outputs the detected signals to the control section.

The display and operation section 17 can be any one of a touch panel, which employs any one of a pressure sensitive method, an electrostatic capacity sensitive method, etc., a hardware keying panel, etc. The touch panel is provided with the touch detecting section 17a constituted by a plurality of transparent electrodes arranged in a lattice pattern, etc., so as to detect a pressing action or a contacting action applied onto the touch panel, and outputs the detected signals to the control section. Further, the display and operation section 17 displays various kinds of screens including a setting screen for setting processing conditions thereon and an input screen for inputting authentication data thereon, and also, allows a user to perform various operations including a setting operation of the processing conditions and an inputting operation of the authentication data. In this connection, although the touch panel is employed as the display and operation section 17 in the present example, the display and operation section 17 may be constituted by a display section and an operation section provided as separated bodies. In this case, the touch detecting section 17a may serve as an operation detecting section to output signals regarding operations performed on the operation section to the control section.

The scanner 18 serves as a section to optically read image data from a document placed on the platen, and is provided with: a light source that emits a light beam to be scanned onto the document: an image sensor that includes a CCD (Charge Coupled Device), etc., to convert the light beam reflected from the document to electric signals; and an analogue to digital convertor that applies an analogue-to-digital conversion processing to the electric signals above-converted. Further, the scanner 18 is provided with the document detecting section 18a constituted by a photo-sensor, an electric contact, etc. Still further, the document detecting section 18a detects a presence or absence of the document currently placed on the platen, and then, outputs the detected signal to the control section.

Remote Terminal:

The remote terminal of the present example can be any one of an exclusive operation terminal device, a smartphone, a tablet terminal device, etc. As indicated in the block diagram illustrated in FIG. 3, the remote terminal 20 is constituted by: a CPU (Central Processing Unit) 21; a storage section 22, such as a ROM (Read Only Memory), a RAM (Random Access Memory), etc.; a network interface (I/F) section 23; an authentication data acquiring section 24; a display and operation section 25; and a battery 26.

The CPU 21 executes controlling programs stored in the ROM in order to conduct arithmetic calculation processing for controlling overall operations to be performed in the remote terminal 20. The ROM stores various kinds of programs including the controlling programs to be executed by the CPU 21 and other data, therein. The RAM stores arithmetic calculation results, setting information, authentication data, etc., therein. Then, the CPU 21, the storage section 22, and, as needed, a storage device, such as an HDD (Hard Disc Drive), constitute a control section.

When acquiring the information about the change in the states and settings from the image forming apparatus 10, the control section of the remote terminal outputs a notification that a change in the states and the settings has been made, through an output section, by operating the display and operation section 25 to display a message indicating the information or operating a speaker to output an audible message indicating the information, so as to notify the change to a user. Further, each of the display and operation section 25 and the speaker works as an output section which outputs a notification of a change in states and settings.

The network interface section 23 is constituted by a NIC (Network Interface Card), etc., so as to implement an operation for connecting with the image forming apparatuses 10 through any one of communication networks, including a wireless LAN, an NFC (Near Field Communication), the Bluetooth (Registered Trade Mark), the TransferJet (Registered Trade Mark), an infrared data communication, a visible light communication, etc. Then, the network interface section 23 sends (outputs) various kinds of information including the setting information and the authentication data, and receives the information that the change in states and settings has been made, user's information and so on, from the image forming apparatuses 10.

The authentication data acquiring section 24 operates the display and operation section 25 to display an input screen which allows a user to input authentication data thereon, and then, compares the inputted authentication data (for instance, a user's ID and/or password, user's identification information such as biometric authentication information or the like, identification information of the remote terminal 20 such as an ID of the own terminal and/or an IP address, etc.), which has been inputted from the input screen by the user, with the authentication data stored in advance, therein, or acquired from the image forming apparatus 10. Successively, when determining that the inputted authentication data coincides with the stored authentication data, the authentication data acquiring section 24 determines that the concerned user has an operating authority in regard to the predetermined operation of the image forming apparatus 10 concerned.

The display and operation section 25 can be any one of a touch panel, which employs any one of a pressure sensitive method, an electrostatic capacity sensitive method, etc., a hardware keying panel, etc. Further, the display and operation section 25 displays various kinds of screens including a setting screen for setting processing conditions thereon, and an input screen for inputting authentication data, and also, allows a user to perform a setting operation of the processing conditions, an inputting operation of the authentication data, etc. In this connection, each of the input screen and the input screen can be a screen on a Web browser, provided from the image forming apparatus 10 serving as a Web server, or a screen independently created by the remote terminal 20. Further, in a case where a smartphone or a tablet terminal is employed as the remote terminal 20, each of the input screen and the input screen can be such a screen that is created by executing an application program for remotely operating the image forming apparatus 10 (namely, an application program provided by the manufacturer that manufactures the image forming apparatuses 10).

The battery 26 is a lithium-ion secondary battery or the like, to supply electric power to various kinds of sections provided in the remote terminal 20 so as to activate them.

Incidentally, each of the configurations indicated in the schematic diagram and the block diagrams, illustrated in FIG. 1 through FIG. 3, is merely an example of embodiments of the present invention. Disclosed example can be varied by a skilled person without departing from the spirit and scope of the invention. For instance, although the image forming system, disclosed herein as the present example, is constituted by a combination of the plurality of image forming apparatuses 10 and the remote terminal 20, the system may be constituted by either a single unit of image forming apparatus 10 or a plurality of image forming apparatuses 10, or a combination of a single unit of image forming apparatus 10 and a single unit of remote terminal 20.

The operations to be conducted by the image forming apparatus 10, configured as aforementioned, will be detailed in the following. The CPU 11 develops onto the RAM the controlling program stored in the ROM, in order to implement the processing indicated in the flowchart shown in FIG. 4, by executing the controlling program developed. In this connection, it will be assumed in the following descriptions that a single user controls a plurality of image forming apparatuses 10, and the plurality of image forming apparatuses 10 and the remote terminal 20 commonly own (share) the setting information of the image forming apparatuses 10, the information, indicating the fact that a change in states and settings has been made and the identification information of the user who actually performed the setting operations.

The control section of the image forming apparatus 10 operates the display and operation section 17 to display the input screen from which the authentication data is to be inputted, thereon, so as to allow a user to input the authentication data therefrom (Step S101). Then, the authentication data acquiring section 14 compares the authentication data, inputted by the user in Step S101, with the other authentication data stored into the storage section 12 or the like, in advance, to implement the authentication processing (Step S102). In a case of failing in the authentication processing, the control section operates the display and operation section 17 to display a message indicating the failure of the authentication processing (Step S103) and returns to Step S101 to repeat the same process.

On the other hand, in the case of succeeding in the authentication processing, the user performs various kinds of setting operations, including: placing a document onto the scanner 18, operating the display and operation section 17 so as to establish various kinds of image processing conditions including a size of paper sheet, a color or monochrome printing mode, enlargement or reduction of an image size, factors for a page allotment mode, etc., various kinds of post processing conditions including factors for a punch processing, factors for a staple processing, etc., setting paper sheets into the paper feed tray 16, etc., while, the control section stores information, which specifies the states and the settings, into the storage section 12 (Step S104). Further, an option setting in regard to whether or not the remote terminal 20 issues an instruction for commencing the processing is also established in this step. For instance, a "Remote Printing Mode" button for issuing an instruction to start the processing is disposed within the screen displayed on the display and operating section 17, so that, when the user touches the concerned button, the remote printing mode is established and the setting information thereof is stored into the storage section 12.

Successively, the control section determines whether or not the processing should enter into the operation mode for monitoring the states and the settings (Step S105). Concretely speaking, the control section determines whether or not the processing should enter into the operation mode for monitoring the states and the settings, corresponding to the result of determining whether or not the start button disposed on the display and operation section 17 is depressed within a predetermined time interval after the predetermined setting operation has been completed. Incidentally, hereinafter, the operation mode for monitoring the states and the settings may be also referred to as a monitoring mode, for simplicity. In a case where the processing should not enter into the monitoring mode, in other words, in a case where the start button or the like has been depressed within the predetermined time interval, the control section controls the scanner 18 to read the document currently placed on the platen, and applies various kinds of image processing as needed in accordance with the processing conditions, established by the display and operation section 17, to image data acquired by the scanner 18, so as to output the processed image data to the image outputting section 15. Based on the processed image data above-outputted, the image outputting section 15 forms an image and transfers the image onto a paper sheet, according to the processing conditions established in advance, so as to output the image-bearing paper sheet therefrom (Step S109). After that, the control section deletes the authentication data inputted (Step S110), and then, finalizes the consecutive processing (END).

On the other hand, when determining that the processing should enter into the monitoring mode, the control section transmits the user's information of the user who currently operates the image forming apparatus 10, and the information indicating the fact that a change in states and settings has been made (including the setting information in regard to the remote printing mode), to another image forming apparatuses 10 and/or the remote terminal 20, which are coupled to the image forming apparatus 10 concerned through the network interface section 13, so as to own (share) the above-mentioned information commonly among them (Step S106). Successively, the control section implements a state and setting change monitoring processing (Step S107) and a scanner operation processing (Step S108) in parallel.

Next, the state and setting change monitor processing to be implemented in Step S107 will be detailed in the following. The CPU 11 develops the controlling program, stored in the ROM, onto the RAM, in order to implement the processing indicated in the flowchart illustrated in FIG. 5, by executing the controlling program developed.

Based on the signals outputted from the document detecting section 18a, the opening and closing detecting section 16*a*, and the touch detecting section 17*a*, the control section of the image forming apparatus 10 monitors a change in states and settings (Step S201). Concretely speaking, based on a signal outputted from the document detecting section 18*a*, the control section monitors whether or not the document placed on the scanner 18 is removed therefrom, and further, based on a signal outputted from the opening and closing detecting section 16*a*, monitors whether or not the door of the paper feed tray 16 is opened and whether or not paper sheets contained in the paper feed tray 16 are removed, and still further, based on a signal outputted from the touch detecting section 17*a*, monitors whether or not an operation is performed on the display and operation section 17. Successively, when determining that the document placed on the scanner 18 is removed, when determining that the door of the paper feed tray 16 is opened, and/or when determining that the paper sheets contained in the paper feed tray 16 are removed, the control section detects a change in states and settings.

Successively, detecting a change in states and settings, the control section turns a setting change flag, provided in advance, at "ON" (Step S202). In this connection, hereinafter, it is assumed that the setting change flag is allotted to a specific address in the storage section 12.

Still successively, the control section sends the user's information (for instance, the user's ID and/or password, the user's identification information such as the biometric authentication information or the like, etc.) of the user who currently operates the image forming apparatus 10 concerned, and the information indicating the fact that a change in states and settings has been made (including the setting information in regard to the remote printing mode), to another image forming apparatuses 10 and/or the remote terminal 20, which are coupled to the image forming apparatus 10 concerned through the network interface section 13, in order to commonly own (share) the information among them (Step S203).

Still successively, the control section displays a message, indicating that the image forming apparatus 10 has a schedule to be used, on the screen of the display and operation section 17 or outputs an audible message indicating the same from the speaker, in order to give a warning to another user (Step S204). Concretely speaking, the control section notifies such a user who is about to remove the document from the paper sheet placing plate, a user who has opened the door of the paper feed tray 16, or a user who is about to remove the paper sheet currently accommodated in the paper feed tray 16, of the warning message indicating that the image forming apparatus 10 has a schedule to be used, in order to make such the user quit any one of the above-mentioned actions. Further, in a case where the user who has conducted the setting operations for the image forming apparatus 10, serving as a sender of the information indicating the fact that the change in the states and settings has been made in Step S203, is in midcourse of using another of the image forming apparatuses 10, serving as a receiver of the information concerned (in other words, in a case where the user's information, received by the receiver, coincides with user's information inputted from another of the image forming apparatuses 10 concerned), the control section of another of the image forming apparatuses 10 concerned displays a message, indicating the fact that the change in the states and settings has been made, on the screen of the display and operation section 17 or outputs an audible message indicating the same from the speaker, in order to notify the user of the message concerned. Still further, in a case where the user who has conducted the setting operations for the image forming apparatus 10, serving as a sender of the information, is in midcourse of operating the remote terminal 20 (in other words, in a case where the user's information received, coincides with user's information inputted from the remote terminal 20 concerned), the control section of the remote terminal 20 concerned displays a message, indicating the fact that a change in the states and the settings has been made, on the screen of the display and operation section 25 of the remote terminal 20 or outputs an audible message indicating the same from a speaker, in order to notify the user of the message concerned.

Still successively, the control section operates the display and operation section 17 to display the input screen for inputting the authentication data, so as to allow a user to input the authentication data therefrom (Step S205). Then, the authentication data acquiring section 14 compares the authentication data, inputted in Step S205, with the other authentication data stored in advance into the storage section 12 or the like, so as to achieve the authentication processing (Step S206). In a case of failing in the authentication processing, the control section operates the display and operation section 17 to display a message indicating the failure of the authentication processing (Step S207), and returns to Step S204 in order to continue notifying the user of the warning message.

On the other hand, in a case of succeeding in the authentication processing, the control section finalizes the operation for notifying the user of the warning message (Step S208), and turns the setting change flag "OFF" (Step S209). At this time, after confirming the current states of the document and the paper sheets, and the settings of the processing conditions of the display and operation section 17, the user who has conducted the setting operations turns the changed state and setting back to the original state and setting. For instance, in a case where the document set onto the scanner 18 has been removed or replaced with another document, the concerned user may set an appropriate document again, while, in a case where the paper sheet has been removed from the paper feed tray 16 or replaced with another paper sheet, the concerned user may set a desired paper sheet therein. Further, in a case where the setting of the processing condition has been changed, the concerned user may reset the changed setting to the original setting for the processing condition concerned.

In this connection, it is also applicable that the control section finalizes the operation for notifying the user of the warning message at the time when the control section confirms that the changed state and setting have been turned back to the original state and setting, instead of finalizing the operation for notifying the user of the warning message at the time when succeeding in the authentication processing. Then, the control section transmits the user's information of the user who currently operates the image forming apparatus 10 concerned and the information indicating the fact that the change in states and settings has been made (including the setting information in regard to the remote printing mode), to another image forming apparatuses 10 and/or the remote terminal 20, which are coupled to the image forming apparatus 10 concerned through the network interface section 13 in order to commonly own (share) the concerned information among them (Step S210), and returns to Step S210 so as to resume the operation for monitoring the change of the state and setting.

Next, the scanner operation processing will be detailed in the following. The CPU 11 develops the controlling program, stored in the ROM, onto the RAM, in order to implement the processing indicated in the flowchart shown in FIG. 6, by executing the controlling program developed. In this connection, it is assumed in the present example that the remote terminal 20 issues an instruction to start the processing. In addition, although the copying operation (operation for forming image onto a paper sheet based on image data acquired by scanning the document) will be exemplified as a processing to be implemented in the following, the process exemplified in the following can be also applied to such a case that the image data acquired by scanning the document is to be transmitted via a facsimile transmission or is to be stored into any one of the storage section, the server, etc., as well.

Initially, the control section of the image forming apparatus 10 monitors an arrival of an instruction to start the processing, which is to be issued from the remote terminal 20 (Step S301). When the user operates the display and operation section 25 provided in the remote terminal 20 to depress the start button or the like so as to instruct the image forming apparatus 10 to start the copy processing, the remote terminal 20 transmits the instruction to start the processing to the image forming apparatus 10 concerned. Then, receiving the instruction information of the start of the processing from the remote terminal 20, the control section of the image forming apparatus 10 requests the remote terminal 20 to send the authentication data, and then, the authentication data acquiring section 14 compares the authentication data, acquired from the remote terminal 20, with the other authentication data stored in advance into the storage section 12 or the like, so as to implement the authentication processing (Step S302). In a case of failing in the authentication processing, the control section operates the display and operation section 17 to display a message indicating the fact that the authentication processing has been failed (Step S303), and then, returns to Step S301 in order to repeat the same process as above-mentioned.

In this connection, herein in the present example, the system is so constituted that the authentication processing is conducted in the image forming apparatus 10 side. However, since the remote terminal 20 acquires the user's information of the user who has performed the setting operation by implementing the processing for commonly owning the information as aforementioned (Step S106 indicated in the flowchart illustrated in FIG. 4, Step S203 and Step S210 indicated in the flowchart illustrated in FIG. 5), it may be also applicable that the authentication processing is conducted in the remote terminal 20 side, and, in a case of succeeding in the authentication processing, the remote terminal 20 transmits the instruction information for commencing the processing to the image forming apparatus 10 concerned. Further, although, herein, the system is so constituted that the user inputs an instruction to start the processing from the remote terminal 20, it may be also applicable that the user inputs the instruction to start the processing through the display and operation section 17 of the image forming apparatus 10 in which the setting operation has been performed by the user concerned. In this case, it may be possible to omit the authentication processing to be performed in Step S302.

Successively, the control section confirms the current state of the setting change flag stored in the storage section 12 (Step S304). When confirming that the current state of the setting change flag is "ON" indicating that a change in states and settings has been made, the control section notifies the remote terminal 20 of the message indicating the fact that the change in states and settings has been made. Receiving the message, the remote terminal 20 makes the display and operation section 25 display the message indicating the fact that the change in states and settings has been made or outputs the audible message of the same from the speaker, so as to notify the user of contents of the message (Step S308). Then, the control section returns to Step S301 to monitor an arrival of an instruction to start the processing.

On the other hand, when confirming that the current state of the setting change flag is "OFF" indicating that a change in states and settings has been made since the setting operation has been completed, the control section controls the scanner 18 to read the document placed on the platen, and implements the necessary image processing according to the processing conditions established by the display and operation section 17, and then, outputs the processed image data to the image outputting section 15. Based on the processed image data above-outputted, the image outputting section 15 forms an image and transfers the image onto the paper sheet, according to the processing conditions established in advance, so as to output the image-bearing paper sheet therefrom (Step S305). After that, the control section deletes the authentication data acquired from the remote terminal 20 (Step S306), and deactivates the processing for monitoring the state and the setting shown in FIG. 5 (Step S307), and then, finalizes the consecutive processing (END).

As described in the foregoing, in a case where the processing is not implemented immediately after the setting operation has been completed, the control section monitors the state of the document and the paper sheet, and when detecting a change in the states and settings, notifies the user of the message indicating that fact, so as to urge the user to confirm the current state or setting, and at the same time, turns the setting change flag "ON". After that, at the time when receiving an instruction to start the processing, the control section confirms the current state of the setting change flag. When confirming that the setting change flag is set at "ON", the control section notifies the user of the message indicating that a change in the state or the setting still exists, and refuses to accept the instruction for commencing the processing. Accordingly, since the processing is not implemented while the state or the setting has been changed, it becomes possible to prevent the image forming apparatus from implementing the processing inappropriately.

Incidentally, it is needless to say that the scope of the present invention is not to the embodiments and examples described in the foregoing. Each of the configurations of the image forming apparatus 10 and the remote terminal 20, described in the embodiments and examples, and the controlling operations to be implemented by the control section can be varied by a skilled person without departing from the spirit and scope of the invention.

For instance, although such the case where the scanner 18 is employed for reading the document has been described as the example in the foregoing, the present invention can be also applied to such a case that the processing is implemented without employing the scanner 18, as well. For instance, in a case where an image, represented by document data stored in a USB (Universal Serial Bus) storage device, is to be printed, after the user has inserted the USB storage device into a USB slot provided in the image forming apparatus 10, and then, has established the print conditions, the control section or the like monitors whether or not the USB storage device is removed and/or another state, until the user actually inputs the instruction for commencing the printing operation. Further, in a case where various kinds of post processing, including a punch processing, a staple processing, a bookbinding processing, etc., is to be applied to image-printed paper sheets, after the user has set the image-printed paper sheets into a predetermined tray provided in the image forming apparatus 10, and then, has established the post processing conditions, the control section or the like monitors whether or not the image-printed paper sheets are removed and/or another state, until the user actually inputs the instruction to start the printing operation.

The invention claimed is:

1. An image forming apparatus for conducting processing according to established settings, comprising:
an output section for outputting a notification; and
a processor configured to:
monitor a change in at least one of states and settings of the image forming apparatus to be made during a time period, wherein the time period ends in response to receiving an instruction from a first user to start a processing,
determine, in response to detecting the change before the time period ends, whether the change comes from an action of a second user who is different than the first user, and
on determining that the change comes from an action of the second user, operate the output section to output, in response to receiving the instruction from the first user, the notification about the change.

2. The image forming apparatus of claim 1, further comprising
a display and operation section configured to set a processing condition thereon, including an operation detecting section configured to detect an operation performed on the display and operation section,
wherein the processor is further configured to, in response to the operation detecting section detecting a certain operation during the time period, determine that a change in the settings has been made and output the notification through the output section.

3. The image forming apparatus of claim 1, further comprising
a scanner section configured to read a document, including a document detecting section configured to detect an existence of the document on the scanner section,
wherein the processor is further configured to, in response to the document detecting section detecting a removal of a document from the scanner section during the time period, determine that a change in the state has been made and output the notification through the output section.

4. The image forming apparatus of claim 1, further comprising
a paper feed tray for containing sheets of paper on which the image forming apparatus forms images, including an opening and closing detecting section configured to detect opening and closing of the paper feed tray,
wherein the processor is further configured to, in response to the opening and closing detecting section detecting opening of the paper feed tray during the time period, determine that a change in the state has been made and output the notification through the output section.

5. The image forming apparatus of claim 1,
wherein the processor is configured to set a flag in response to the change, and ignore the instruction to start the certain processing until the flag is cleared.

6. An image forming system comprising:
the image forming apparatus of claim 1; and
another image forming apparatus connected to the image forming apparatus with a communication network, including an output section for outputting a notification and another processor,
wherein the processor of the image forming apparatus is configured to, in response to the change, send authentication information of the user and information that the change has been made, to the another image forming apparatus through the output section of the image forming apparatus, and
the another processor of the another image forming apparatus is configured to output the notification through the output section of the another image forming apparatus, on the another image forming apparatus being operated by a user identified by the authentication information.

7. An image forming system comprising:
the image forming apparatus of claim 1; and
a remote control terminal for operating the image forming apparatus by remote control, the remote control terminal being connected to the image forming apparatus with a communication network and including an output section for outputting a notification and a another processor,
wherein the processor of the image forming apparatus is configured to, in response to the change, send authentication information of the user and information that the change has been made, to the remote control terminal through the output section of the image forming apparatus, and
the another processor of the remote control terminal is configured to output the notification through the output section of the remote control terminal, on the remote control terminal being operated by a user identified by the authentication information.

8. The image forming system of claim 7,
wherein the processor of the image forming apparatus is configured to set a flag in response to the change, and ignore the instruction to start the certain processing until the flag is cleared, the instruction being received from the remote control terminal.

9. The image forming apparatus of claim 1, wherein the time period starts in response to completion of an operation regarding the settings for the processing conducted by a user.

10. A control method of an image forming apparatus for conducting processing according to established settings, the method comprising:
monitoring a change in at least one of states and settings of the image forming apparatus to be made during a time period, wherein the time period ends in response to receiving an instruction from a first user to start a processing,
determining, in response to detecting the change before the time period ends, whether the change comes from an action of a second user who is different than the first user, and
on determining that the change comes from an action of the second user, and in response to receiving the instruction from the first user, outputting a notification about the change through an output section of the image forming apparatus.

11. A nontransitory computer readable medium encoded with a program to cause an image forming apparatus to execute the control method of claim 10.

12. The nontransitory computer readable medium of claim 11,
wherein the image forming apparatus further includes a display and operation section configured to set a processing condition thereon, the display and operation section including an operation detecting section configured to detect an operation performed on the display and operation section, and the outputting the notification includes, in response to the operation detecting section detecting a certain operation during the time period, determining that a change in the settings has been made and outputting the notification through the output section.

13. The nontransitory computer readable medium of claim 11,
wherein the image forming apparatus includes a scanner section configured to read a document, the scanner section including a document detecting section configured to detect an existence of the document on the scanner section, and
the outputting the notification includes, in response to the document detecting section detecting a removal of a document from the scanner section during the time period, determining that a change in the state has been made and outputting the notification through the output section.

14. The nontransitory computer readable medium of claim 11,
wherein the image forming apparatus includes a paper feed tray for containing sheets of paper on which the image forming apparatus forms images, the paper tray including an opening and closing detecting section configured to detect opening and closing of the paper feed tray, and
the outputting the notification includes, in response to the opening and closing detecting section detecting opening of the paper feed tray during the time period, determining that a change in the state has been made and outputting the notification through the output section.

15. The nontransitory computer readable medium of claim 11,
wherein the outputting the notification further includes, setting a flag in response to the change, and ignoring the instruction to start the certain processing until the flag is cleared.

16. The nontransitory computer readable medium of claim 11,
wherein the image forming apparatus is connected to another image forming apparatus with a communication network, and
the outputting the notification includes,
in response to the change, sending authentication information of the user and information that the change has been made, to the another image forming apparatus through the output section of the image forming apparatus, and
outputting the notification through an output section of the another image forming apparatus, on the another image forming apparatus being operated by a user identified by the authentication information.

17. The nontransitory computer readable medium of claim 11,
wherein the image forming apparatus is connected with a communication network to a remote control terminal for operating the image forming apparatus by remote control, and
the outputting the notification includes
in response to the change, sending authentication information of the user and information that the change has been made, to the remote control terminal through an output section of the image forming apparatus, and
outputting the notification through an output section of the remote control terminal, on the remote control terminal being operated by a user identified by the authentication information.

18. The nontransitory computer readable medium of claim 11, wherein the outputting the notification includes setting a flag in response to the change, and ignoring the instruction to start the certain processing until the flag is cleared, the instruction being received from the remote control terminal.

19. The nontransitory computer readable medium of claim 11, wherein the time period starts in response to completion of an operation regarding the settings for the processing conducted by a user.

20. An image forming apparatus for conducting job processing according to established settings, comprising:
an output section for outputting a notification; and
a processor configured to
monitor a change in at least one of states and settings of the image forming apparatus during a time period, wherein the time period starts in response to receiving a setting operation about job processing performed by a user and ends in response to receiving an instruction from the user to start the job processing, and the at least one of states and settings relates to the job processing,
turn a flag on in response to detecting the change before the time period ends,
turn the flag off in response to confirming that the user who performed the setting operation made the change, and
operate the output section to output the notification about the change, while the flag is on.

21. An image forming apparatus for processing an image forming job according to established settings, comprising:
an output section for outputting a notification; and
a processor configured to:
display a screen on a display, wherein authentication data is inputted via the screen,
acquire a result of an authentication based on the authentication data,
detect a change in at least one of states and settings of the image forming apparatus to be made, and
determine whether the change is detected after a predetermined period, wherein the predetermined period starts in response to receiving a setting for the image forming job,
wherein the processor displays the screen on the display based on a result of the determination when the change is detected after the predetermined period, and
the output section outputs the notification based on the result of the authentication.

\* \* \* \* \*